United States Patent
Chavali et al.

(10) Patent No.: US 10,783,383 B2
(45) Date of Patent: Sep. 22, 2020

(54) METHOD AND APPARATUS FOR DETECTING A BOUNDARY IN AN ENVIRONMENT OF AN OBJECT

(71) Applicant: Continental Automotive GmbH, Hannover (DE)

(72) Inventors: Pothuraju Chavali, Bangalore (IN); Naveen Onkarappa, Bangalore (IN); Gerrit Wischer, Lindau (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 108 days.

(21) Appl. No.: 16/239,654

(22) Filed: Jan. 4, 2019

(65) Prior Publication Data
US 2019/0228237 A1    Jul. 25, 2019

(30) Foreign Application Priority Data
Jan. 22, 2018 (EP) .................................. 18152685

(51) Int. Cl.
*G06K 9/00* (2006.01)
*G05D 1/00* (2006.01)
(Continued)

(52) U.S. Cl.
CPC ......... *G06K 9/00798* (2013.01); *B60W 30/00* (2013.01); *G05D 1/0088* (2013.01);
(Continued)

(58) Field of Classification Search
CPC ........... G06K 9/00798; G06K 9/00812; G06K 9/3233; G05D 1/0274; G05D 1/0231;
(Continued)

(56) References Cited

U.S. PATENT DOCUMENTS

| | | | |
|---|---|---|---|
| 8,705,792 B2 * | 4/2014 | James | G06T 7/246 348/169 |
| 9,476,976 B2 | 10/2016 | Kijima et al. | |

(Continued)

OTHER PUBLICATIONS

Danescu et al., "Modeling and Tracking the Driving Evironment with a Particle-Based Occupancy Grid", IEEE Transactions on Intelligent Transportation Systems, vol. 12, No. 4, Dec. 1, 2011, pp. 1331-1342.

(Continued)

*Primary Examiner* — Phuoc Tran
(74) *Attorney, Agent, or Firm* — RatnerPrestia

(57) ABSTRACT

A detection of a boundary in an environment. For this purpose, information of an occupancy grid is used, wherein the occupancy grid provides information about the probability of occupancy in the environment. Upon detecting a starting transition point between a free and an occupied grid cell in the occupancy grid, a region of interest window surrounding the starting transition point is analyzed to identify further transition points. The identified transition points are combined to one or more polygon chain. After the analysis of the boundary is performed within the region of interest, successive regions of interest may be analyzed. For this purpose, the successive regions of interest are determined based on the transition points and/or the boundary information of a current region of interest window.

16 Claims, 2 Drawing Sheets

(51) Int. Cl.
*G05D 1/02* (2020.01)
*B60W 30/00* (2006.01)
*G06T 7/11* (2017.01)
*G06T 7/70* (2017.01)
*G06K 9/32* (2006.01)

(52) U.S. Cl.
CPC ......... *G05D 1/0231* (2013.01); *G05D 1/0274* (2013.01); *G06K 9/00812* (2013.01); *G06K 9/3233* (2013.01); *G06T 7/11* (2017.01); *G06T 7/70* (2017.01); *G05D 2201/0213* (2013.01); *G06T 2207/30256* (2013.01)

(58) Field of Classification Search
CPC ........ G05D 1/0088; G05D 2201/0213; B60W 30/00; B60W 40/04; G06T 7/11; G06T 2207/30256; G01C 21/34; G01S 13/931
See application file for complete search history.

(56) References Cited

U.S. PATENT DOCUMENTS

| | | | |
|---|---|---|---|
| 10,324,469 B2 * | 6/2019 | Berntorp | G06K 9/00805 |
| 10,394,244 B2 * | 8/2019 | Song | G01C 21/005 |
| 10,657,393 B2 * | 5/2020 | Foroughi | G06K 9/00805 |
| 2012/0053755 A1 * | 3/2012 | Takagi | B60W 40/04 701/1 |
| 2015/0161455 A1 | 6/2015 | Osanai et al. | |
| 2018/0012494 A1 * | 1/2018 | Walessa | G08G 1/16 |

OTHER PUBLICATIONS

Extended European Search Report for European Application No. 18152685.6, dated Nov. 27, 2018, 18 pages.

* cited by examiner

METHOD AND APPARATUS FOR DETECTING A BOUNDARY IN AN ENVIRONMENT OF AN OBJECT

CROSS REFERENCE TO RELATED APPLICATION

This application claims priority to EP Application No. EP 18152685, filed Jan. 22, 2018, the contents of such application being incorporated by reference herein.

FIELD OF THE INVENTION

The present invention relates to a method and an apparatus for detecting a boundary in an environment of an object. The present invention further relates to an advanced driver assistance system, an autonomous driving vehicle and an industrial robot system.

BACKGROUND OF THE INVENTION

Although applicable in principle to any system applying free space detection, the present invention and its underlying problem will be hereinafter described in connection with an advanced driver assistance system.

Modern vehicles like cars or trucks usually comprise driver assistance systems which may support the driver of a vehicle when performing driving maneuvers. For performing automatic driving maneuvers, a free space in the surrounding of a vehicle has to be detected. Driving maneuvers may be, for instance a maneuver for navigating a vehicle in an empty parking lot, driving the vehicle within a particular lane or an overtaking maneuver. For all these maneuvers, a fast and reliable determination of a free space surrounding the vehicle is mandatory.

However, the determination of the free space in the surrounding of a vehicle and in particular the identification of a boundary between a free and occupied space requires huge computation effort and is error-prone. Thus, there is a need for an efficient and reliable determination of a boundary between the free space and the occupied space in the environment of a vehicle.

SUMMARY OF THE INVENTION

An aspect of the present invention provides a method for detecting a boundary in an environment of an object, and an apparatus for detecting a boundary in an environment of an object.

Accordingly, it is provided:

A method for detecting a boundary in an environment of an object. The method comprises a step of providing an occupancy grid. The occupancy grid comprises a plurality of grid cells. Each grid cell comprises a probability of an occupancy in the environment of the object. The method further comprises the steps of detecting a starting transition point in the occupancy grid based on the values of the grid cells in the occupancy grid and assigning a region of interest window in the occupancy grid surrounding the identified starting transition point. Further, the method comprises the steps of detecting further transition points in the occupancy grid based on the values of the grid cells in the region of interest window and combining the detected starting transition point and the detected further transition points to a number of polygon chains for specifying a boundary in the occupancy grid.

Further, it is provided:

An apparatus for detecting a boundary in an environment of an object. The apparatus comprises an occupancy detector, a boundary detector and a boundary processor. The occupancy detector is adapted to provide an occupancy grid comprising a plurality of grid cells. Each grid cell comprises a value for a probability of occupancy in the environment of the object. The boundary detector is adapted to detect a starting transition point in the occupancy grid based on the values of the grid cells in the occupancy grid, assign a region of interest window in the occupancy grid surrounding the identified starting transition point, and detecting further transition points in the occupancy grid based on the values of the grid cells in the region of interest window. The boundary processor is adapted to combine the detected starting transition point and the further detected transition points to a number of polygon chains for specifying a boundary in the occupancy grid.

As explained above, the detection of a free space in the environment of a vehicle, in particular the detection of a boundary between the free and the occupied space is very important for performing partial or fully automated maneuvers by a vehicle. For this purpose, an aspect of the present invention aims to provide an efficient and reliable detection of a boundary between the free and the occupied space in the surrounding. Especially, an aspect of the present invention aims to provide an efficient and high-reliable detection of a boundary based on an occupancy grid.

An aspect of the present invention therefore provides a detection of a boundary between free and occupied space by determining particular windows of a region of interest and analyzing the occupancy grid data in such a region of interest window. Accordingly, by limiting the detailed analysis for detecting the boundary to particular region of interest windows, the detection of the transition between free and occupied cells in the occupancy grid can be improved. Especially, by limiting the analysis to particular region of interest windows, it is no longer necessary to analyze the data of the whole occupancy grid, but only to the data in the identified region of interest windows. Thus, the detection of the boundary for specifying the transition between free and occupied cells in the occupancy grid can be accelerated and the computational effort can be reduced.

Furthermore, by a successively analyzing a plurality of region of interest windows, the information of a previously analyzed region of interest windows can be used to verify and prove the detected boundary in successive region of interest windows. Accordingly, the reliability of a detected boundary for specifying the transition between free and occupied grid cells in the occupancy grid can be improved.

The grid cells in the occupancy grid may comprise the value for describing a probability for degree of occupancy on a corresponding position in the environment. For example, a high value in the grid cell may indicate that there might be a low probability an occupancy at the corresponding position in the environment, while a low value in the grid cell may indicate that there is a high probability for an occupancy at the corresponding position in the environment. However, alternatively or additionally grid cells in the occupancy grid may also comprise values for describing the probability of free position in the environment. In one example, the sum of the probability for free position and the probability for an occupancy in a grid cell may be 1. However, it may be also possible to consider an uncertainty for the occupancy and/or the free positions. In such a case, the sum of the probabilities may be different from the one, in particular lower than 1. Furthermore, it may be also possible that no knowledge of a decree of occupancy is available for a grid cell. In this case, the value of the respective grid cell may be set to a particular value or the respective grid cell may comprise a particular flag for indicating that no reliable value is available for the respective grid cell.

Depending on the transitions in the region of interest window, a number of one or more polygon chains may be determined in each region of interest window. In particular, even though it may be possible in some cases the transition points may be combined to one single polygon chain, an aspect of the present invention is not limited to only one polygon chain in each region of interest window. Moreover, it may be also possible that more than one polygon chains may be determined in a region of interest window, i.e. not all transition points in a region of interest window are combined to a single polygon chain.

In a possible embodiment, the occupancy grid comprises a two-dimensional representation of grid cells specifying a probability of an occupancy corresponding to an associated position in the environment of the object. For instance, for each grid cell of the occupancy grid a probability of occupancy can be determined and a value corresponding to this probability may be assigned to a respective grid cell. Based on this probability, it may be possible to determine whether or not an object may be located at a position corresponding to the respective grid cell. Accordingly, by comparing the values, especially the probabilities assigned to the respective grid cells, it may be possible to identify positions in the occupancy grid at which a transition between a free space and space occupied by an object may occur. However, it is understood that any other kind of occupancy grid for specifying a degree of occupancy in the environment may be possible, too.

In a possible embodiment, the occupancy grid may be computed based on Dempster-Shafer Theory. The Dempster-Shafer Theory is a very suitable approach for determining the occupancy in the environment of the object. However, it is understood that any other approach for determining and specifying the occupancy in the environment of the object may be possible, too.

In a possible embodiment, the first starting transition point is detected in the direction orthogonal to a moving direction of the object. Especially, for detecting a boundary on the left-hand side of the object, a first starting point may be directed to the left direction orthogonal to the moving direction of the object. Accordingly, for detecting a boundary on the right-hand side of the object, the further starting transition point may be directed to the right direction in the moving direction of the object. For example, the values in the occupancy grid which lay on a line orthogonal to the moving direction of the object may be analyzed in order to identify a predetermined transition. For example, it may be possible to determine a starting point at a position where a value in the occupancy grid exceeds a predetermined threshold or at which the value increases about a predetermined ratio. However, it is understood that any other scheme for determining a transition between free and occupied grid cells in the occupancy grid may be also possible.

In a possible embodiment, the size of the region of interest window may be adapted based on a distance between the object and a center of the region of interest window. Especially, if one dimension of a region of interest window is almost orthogonal to the moving direction of the object, the size of this dimension may be adapted depending on the distance between a center point of the region of interest window and the object. Furthermore, a dimension which is almost parallel to the moving direction of the object may be kept constant, or may be also adapted depending on the distance between the center of the region of interest window and the object. Furthermore, it may be also possible to use a fixed, predetermined size for the region of interest window. However, it is understood that any other possible approach for selecting the size or at least one dimension of the region of interest window may be also possible.

In a possible embodiment, a center point for a further region of interest window may be determined based on the further transition points in a current region of interest window. Further, it may be also possible to take into account a direction between the two most distant transition points of a polygon chain in the region of interest window. Especially, it may be possible consider a weighted average of the center of a region of interest window and the further transition points of the region of interest window or of a polygon chain.

In a possible embodiment, the orientation of a further region of interest window may be determined based on the further transition points in the current region of interest window. For example, it may be also possible to take into account the direction between the two most distant transition points in a polygon chain of the region of interest window. However, it is understood that any other approach for selecting an orientation of the further region of interest window may be also possible. By adapting the orientation of the region of interest window and/or the center point of the region of interest window, it may be possible to adapt the region of interest windows even if the boundary between the free and the occupied grid cells in the occupancy grid is not straight forward. Thus, the accuracy of the boundary detection can be improved.

In a possible embodiment, the center point and/or the orientation of a further region of interest window is based on a weighted average of the further transition points and the center of the current region of interest window.

In a possible embodiment, the center point and/or the orientation of a further region of interest window is based on the further transition points relating to the longest polygon chain in the current region of interest window.

In a possible embodiment, the orientation of the further region of interest window is only adapted, if a difference between the orientation of the current region of interest window and the desired orientation of the next region of interest window is less than a predetermined threshold value. By limiting the acquisition of the orientation for the region of interest window to a particular threshold value, the reliability and the accuracy may be further improved. In particular, failures of outliners to an inaccuracy or an error in the detection of the environment may be compensated. Especially, the threshold value for limiting the takeover of the orientation for the region of interest window may be dynamically adapted. For example, the threshold value may be adapted depending on previous changes of the orientation for the region of interest windows. Hence, if only small changes occur in the orientation between successive region of interest windows, it may be assumed, for instance, that the boundary relates to an almost straight road, and consequently no sharp curves will occur. However, if higher changes occur in the boundary, it may be assumed that also higher changes in the orientation may be possible for the successive region of interest windows.

In a possible embodiment, a length of a region of interest window and/or a distance between neighboring region of interest windows is adapted based on deviation of the orientation between neighboring region of interest windows. For example, if the orientation between neighboring region of interest windows changes more than a predetermined threshold value, a road boundary may be considered to be curvy. In this case, the size/length of the region of interest windows may be reduced or the distance between neighboring region of interest windows may be reduced. Hence, the accuracy can be increased. Otherwise, if the orientation between neighboring region of interest windows does not change more than the predetermined threshold value, the road boundary to be considered to be less curvy and thus, the size/length of region of interest windows may be increased and/or the distance between neighboring region of interest windows may be increased.

In a possible embodiment, a further region of interest window is only determined if a current region of interest window does not exceed a boundary of the occupancy grid. Otherwise, if the current region of interest window reaches a boundary of the occupancy grid, the determination of further region of interest windows may be stopped, since no further data for identifying the boundary can be provided by the occupancy grid. In this way, the determination of the boundary may be performed step by step by successively analyzing the data in the occupancy grid individually for each region of interest window upon a border of the occupancy grid is reached.

In a possible embodiment for the apparatus for detecting a boundary, the occupancy detector may comprise an optical sensor, a radar sensor and/or an ultrasonic sensor. However, any other appropriate sensor for scanning the environment of the respective object may be also possible. Especially, data from more than one sensor, and in particular data from a plurality of heterogeneous sensors may be used for scanning the environment and providing the occupancy grid data.

An aspect of the present invention provides further an advanced driver assistance system comprising an apparatus for detecting a boundary.

Further, an aspect of the present invention provides an autonomous driving vehicle comprising an apparatus for detecting a boundary.

Finally, an aspect of the present invention provides an industrial robot system comprising the apparatus for detecting a boundary.

BRIEF DESCRIPTIONS OF THE DRAWINGS

For a more complete understanding of aspects of the present invention and advantages thereof, reference is now made to the following description taking in conjunction with the accompanied drawings. Aspects of the invention are explained in more detail below using exemplary embodiments which are specified in the schematic figures of the drawings, in which.

Figure 1:
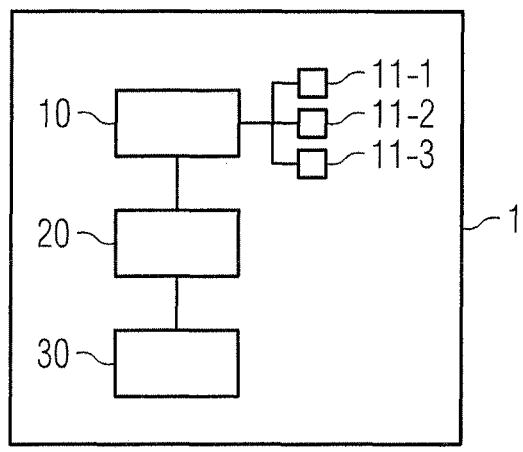
FIG. 1 shows a block diagram of an embodiment of an apparatus for detecting a boundary according to an aspect of the present invention.

The appended drawings are intended to provide further understanding of the embodiments of the invention. They illustrate embodiments and help to explain principles and concepts of aspects of the invention. Further embodiments and many of the advantages mentioned become apparent in view of the drawings. The elements in the drawings are not necessarily shown in scale.

DETAILED DESCRIPTION OF THE PREFERRED EMBODIMENTS

FIG. 1 shows a block diagram of an apparatus 1 for detecting a boundary. The apparatus 1 for detecting a boundary comprises an occupancy detector 10, a boundary detector 20 and boundary processor 30. The occupancy detector 10 may comprise optical sensors 10-1, a radar sensor 10-2 and/or an ultrasonic sensor 10-3. However, it is understood that any other sensor for scanning the environment and providing data related to the occupancy in the environment may be also possible. The sensors 10-$i$ may scan the environment and provide sensor data which can be analyzed. For instance, occupancy detector 10 may receive the sensor data from the sensors 10-$i$ and process the sensor data in order to generate an occupancy grid. The occupancy grid may be, for example, a two-dimensional representation for specifying at each grid cell of the occupancy grid a probability for a degree of occupancy. For example, the occupancy grid may be a two-dimensional matrix where each matrix element represents a probability value for an occupancy at the respective position. In a possible embodiment, the occupancy grid may be computed based on Dempster-Shafer Theory. However, any other approach for computing values of the occupancy grid may be also possible. The occupancy grid may be computed by a processor included in the occupancy detector 10. However, it may be also possible that the occupancy grid may be computed outside the occupancy detector 10 and the occupancy detector 10 receives the data of the occupancy grid via a respective interface. The grid cells of the occupancy grid may further comprise a way you relating to a probability of a free position at a corresponding position in the environment. The values for the free and the occupied probability may be determined independently. In such a case, it may be possible that the sum of the probability for a free and an occupied grid cell may be different from 1. In particular, it may be impossible that for at least some of the principles no reliable probability can be determined. In such a case, the respective grid cell may be set to a predetermined value or a flag corresponding to respective grid cell may be set to particular value to indicate that no reliable value has been determined.

Based on the data provided by grid cells of the occupancy grid, boundary detector 20 performs a determination of transition points which relate to a transition between positions of the occupancy grid which may relate to a free grid cell and positions in the occupancy grid which relate to an occupied grid cell. The determination of the transition points will be explained in more detail below. In general, boundary detector 20 first detects a starting transition point in the occupancy grid which relates to a first transition point of a transition between a free and an occupied grid cell in the occupancy grid. Next, a region of interest window is assigned based on the determined starting transition point. For example, the region of interest window may have a predetermined size, wherein the starting transition point is a center point of the region of interest window. After assigning the region of interest window, further transition points are determined in the region of interest window by analyzing the values of the grid cells in the occupancy grid within the region of interest window. Accordingly, a plurality of transition points relating to a transition between a free and an occupied grid cell in the region of interest window are determined.

Based on the determined transition points in the region of interest window, boundary processor 30 combines the detected transition points, in particular the detected starting transition point and the detected further transition points to a number of one or more polygon chains. Accordingly, the number of polygon chains of the determined transition points specify the boundary between the free space and the occupied space in the occupancy grid.

After the polygon chains for specifying the boundary between the free and the occupied grid cells in the region of interest window have been generated, a further center point for a successive region of interest window can be determined and subsequently, a further a detection of a number of polygon chains within the further region of interest window can be computed.

In the following, the individual operations for detecting the boundary will be explained in more detail.

Figure 2:
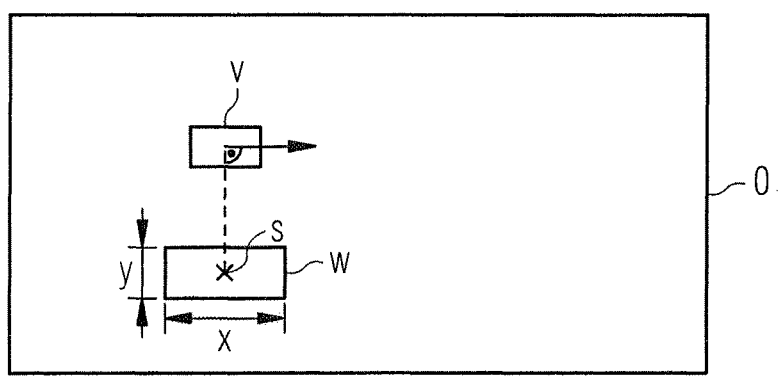
FIG. 2 shows a occupancy grid which may be used for detecting a boundary in an embodiment of the present invention.

FIG. 2 shows a schematic drawing illustrating the process for determining the starting transition point S and the related region of interest window W. For example, an occupancy grid O is provided comprising grid cells for specifying the probability of the occupancy in the environment of a vehicle V. Furthermore, the arrow related to the vehicle V illustrates the direction of moving of the vehicle V. Starting from this scenario, a first starting transition point S is determined. For this purpose, the values in the grid cells of the occupancy grid along a line which is orthogonal to the direction of moving of the vehicle V are analyzed. Even though in FIG. 2 only an analysis on the right-hand direction of the vehicle V is shown, it is understood that the same analysis may be also performed on the left-hand side of the vehicle V. To identify the starting transition point S, the values of the individual grid cells along the line which is orthogonal, to the moving direction of the vehicle V may be evaluated. For example, the starting transition point S may be determined as a point along the line at which the probability for an occupancy in the occupancy grid exceeds a predetermined threshold. However, any other scheme for determining the transition point may be also possible. For example, it may be also possible to analyze a ratio between neighboring grid cells of the occupancy grid O or to perform any other analysis for evaluating the occupancy grid and identifying a starting transition point S. Moreover, it may be also possible to analyze values of the grid cells relating to a probability for a free position. If no reliable values for at least some of the grid cells are available, it may be also possible that a transition point may be determined at a transition from known to an unknown/uncertain occupancy value of a grid cell.

After the starting transition point S has been determined, a region of interest window W surrounding the starting transition point S is assigned. For example, the region of interest window W may have a rectangular shape. Especially, the starting transition point S may be in the center of the region of interest window W. For example, the region of interest window W may have a predetermined size, for example a predetermined length x and a predetermined width y. Especially, it may be possible to assign always a region of interest window W having a same size. However, it may be also possible to adapt the size of the region of interest window W. For example, the width y may be adapted depending on the distance between the vehicle V and the starting transition point S. Accordingly, the length x of the region of interest window W may be also kept either constant or may be adapted. For example, the size of the region of interest window, in particular the length x of the region of interest window may be adapted depending on properties of a boundary of a road. If the boundary of the road is curvy, the length x of the region of interest window W may be set to a smaller value and if the boundary of the road is almost straight, the length x of the region of interest window W is set to larger value. For instance, shape of a polygon chain in a region of interest window W may be analyzed, and based on and analysis of the polygon chain, the length x of our original interest window W may be adapted accordingly. It is understood, that any other scheme for adapting the size of the region of interest window W may be also possible. Even though a rectangular region of interest window W has been applied in the example of FIG. 2, any other shape for selecting a region of interest window W may be also possible.

Figure 3:
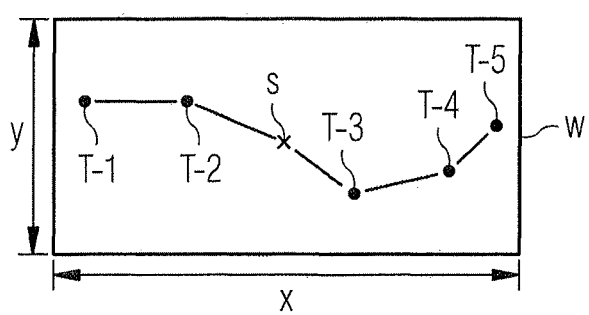
FIG. 3 shows a region of interest window which may be used for detecting a boundary in an embodiment of the present invention.

FIG. 3 shows an example for determining the boundary B in a region of interest window W. Once the starting transition point S of the region of interest window W has been determined and the region of interest window W has been assigned successively, the data of the grid cells in the occupancy grid O within the region of interest window W may be further analyzed. In particular, further transition points T-i will be detected. The detection of the further transition points T-i may be performed similar to the detection of the starting transition point S. Accordingly, a number of further transition points T-i within the region of interest window W may be determined. The number of the further transition points T-i may be variable or fixed. For example, a predetermined number of further transition points T-i may be identified in the region of interest window W. However, it may be also possible to adapt the required number of transition points T-i within the region of interest window W depending on the size of the region of interest W. Furthermore, it may be also possible to identify as many transition points T-i as possible within the region of interest window W.

After the transition points T-i within the region of interest window W have been detected, the detected transition points T-i within the region of interest window W may be combined to a number of one or more polygon chains B. For example, a transition point T-i may be connected to the closest neighboring transition points T-i. In this way, a chain of the transition points T-i represent a boundary between the free and the occupied space within the region of interest window W. Hence, this chain B may be considered as the boundary for specifying the free space surrounding the vehicle V.

In order to extend the free space boundary, a further region of interest window may be assigned. For this purpose, a center point of a further region of interest window W has to be determined and subsequently, the further region of interest window may be assigned based on the determined center point. For this purpose, the center point for a further region of interest window W may be determined based on the transition points T-i within the current region of interest window W. For example, it may be possible to determine a direction based on a polygon chain B formed by the transition points T-i of the current region of interest window W. In particular, if more than one polygon chain has been determined in the current region of interest window, the longest polygon chain may be used. For example, a principle component analysis (PCA) may be applied. However, it is understood that any other approach for determining a direction of a polygon chain B formed by the transition points T-i may be possible, too. Furthermore, it may be also possible to determine a direction based on the outermost transition points T-i of a determined polygon chain in the region of interest window W, i.e. the first and the last transition point T-i in the direction of the movement of the vehicle V. It is understood, that any other approach for determining the direction of the next region of interest window W may be also possible. For example, the next center point of a region of interest window W may be determined in the direction of the moving of the object O. A next center point may be selected having a distance to the current center point of a region of interest W being almost equal to the length x of the region of interest window W. In this way, neighboring region of interest windows W are steering each other. However, it may be also possible to adapt the length x of the region of interest window W. For example, if the orientation of the successive region of interest window W changes more than a predetermined threshold value, the boundary B may be considered to be curvy. In this case, the length x after region of interest window W may be decreased or set to the lower value. Otherwise, in particular if the boundary is not considered to be curvy, i.e. the orientation between the two successive region of interest windows W do not change more than a predetermined threshold value, the length x maybe set to a larger value.

Furthermore, the orientation of the successive region of interest window may be adapted depending on the direction of the polygon chain B in the current region of interest window W or the direction specified by the outermost transition points T-i in a polygon chain of the current region of interest window W. For example, the direction specified by the polygon chain B may be used as the orientation of the successive region of interest window, if the deviation between the direction specified by the polygon chain B and the direction between the outermost transition points T-i is less than a predetermined threshold. Otherwise, if the deviation between the two directions exceeds a predetermined threshold, for example 30 degrees, this may indicate a high uncertainty. In this case, the orientation of the current region of interest window may be used as an orientation for the successive region of interest window. However, it is understood that any other approach for determining the orientation of the successive region of interest window may be also used. For example, it may be possible to determine a mean value of the orientations of the individual edges within the polygon chain B and to use the mean value of all the orientations within the polygon chain as a basis for the orientation of the successive region of interest window.

After the successive region of interest window has been assigned, the transition points within this successive region of interest window may be computed in the same manner as already described above for the current region of interest window W. Hence, the boundary between the free space and the occupied space may be continued by the polygon chain B in the successive window.

The determination of further center points and polygon chains in further region of interest windows W may be continued until a boundary of the occupancy grid O has been reached. In this way, the boundary between the free space and the occupied space in the occupancy grid may be easily determined from a position orthogonal to the moving direction of the vehicle to the boundary of the occupancy grid. As already mentioned above, this determination of the boundary may be performed to the left-hand side and the right-hand side of the vehicle V.

Figure 4:
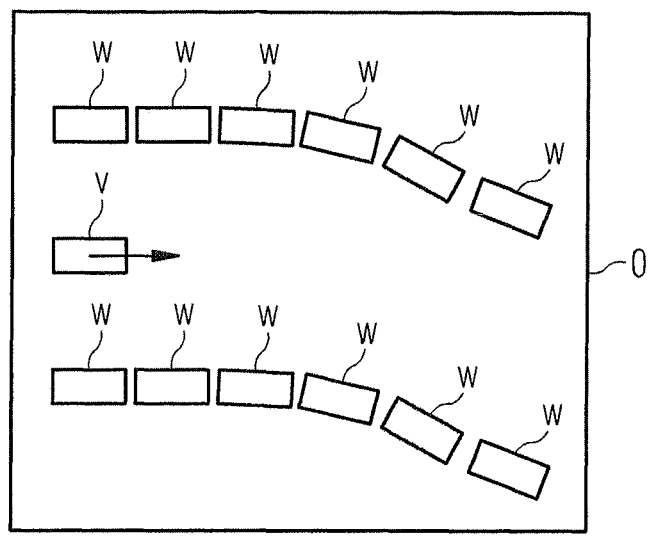
FIG. 4 shows a drawing for detecting a boundary in a region of interest window according to an aspect of the present invention.

FIG. 4 illustrates a schematic drawing for determining the boundaries in an occupancy grid O. As can be seen in FIG. 4, a plurality of center points and region of interest windows W are determined on each side of the vehicle V. The process for determining the center points and successively the region of interest windows W is performed upon a boundary of the occupancy grid O is reached.

Figure 5:
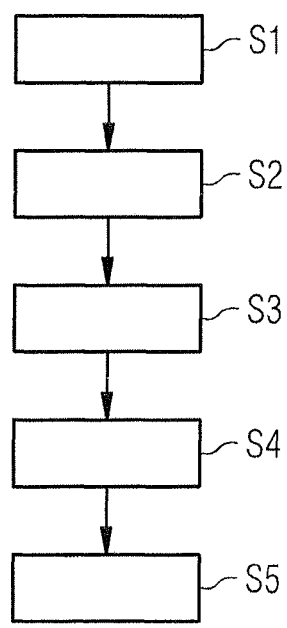
FIG. 5 shows a flowchart of a method for detecting a boundary underlying an embodiment of the present invention.

FIG. 5 illustrates a flowchart for performing a method for detecting a boundary on an environment according to an embodiment. In a step S1 an occupancy grid is provided, wherein the occupancy grid comprises a plurality of grid cells. Each grid cell may comprise a value for a probability of an occupancy in the environment of a vehicle V. In step S2 a starting transition point S is detected in the occupancy grid based on the values in the grid cells of the occupancy grid O. In step S3 a region of interest window W surrounding the identified starting transition point S is assigned. In step S4 further transition points T-i between grid cells of the region of interest window W are detected. Finally, in step S5 the detected starting transition point S and the further detected transition points T-i are combined to a number of polygon chains B for specifying the boundary in the occupancy grid O.

An aspect of the present invention may be used, for instance for detecting a free space region, in particular a boundary between a free space and an occupied space in the surrounding of a vehicle. This boundary may be used, for instance in an advanced driver assistance system. Especially, the information of the boundary may be used, for instance for lane keeping.

Furthermore, the information of the boundary in the environment of the vehicle may be also used for a fully autonomous driving of a vehicle, or at least for an autonomous lane keeping of a vehicle. However, it is understood, aspects of the present invention are not limited to the above mentioned examples. Moreover, any other appropriate application, for instance a road keeping, maneuvering, or alternated parking may be also possible.

It is understood, that aspects of the present invention are not limited to only a semi-autonomous or fully autonomous driving of a vehicle. Furthermore, an aspect of the present invention may be also applied to any other application which requires information about boundaries. For example, an aspect of the present invention may be also applied to an industrial robot system, wherein a robot arm is moved automatically by a control system.

Summarizing, an aspect of the present invention relates to a detection of a boundary in an environment. For this purpose, information of an occupancy grid is used, wherein the occupancy grid provides information about the probability of occupancy in the environment. Upon detecting a starting transition point between a free and an occupied grid cell in the occupancy grid, a region of interest window surrounding the starting transition point is analyzed to identify further transition points. The identified transition points are combined to one or more polygon chain. After the analysis of the boundary is performed within the region of interest, successive regions of interest may be analyzed. For this purpose, the successive regions of interest are determined based on the transition points and/or the boundary information of a current region of interest window.

The invention claimed is:

1. A method for detecting a boundary in an environment of an object, comprising:
providing an occupancy grid comprising a plurality of grid cells, each grid cell comprising a value for a probability of an occupancy in the environment of the object;

detecting a starting transition point in the occupancy grid based on the values of the grid cells in the occupancy grid;

assigning a region of interest window in the occupancy grid surrounding the identified starting transition point;

detecting further transition points in the occupancy grid based on the values of the grid cells in the region of interest window; and combining the detected starting transition point and the further detected transition points to a number of polygon chains for specifying a boundary in the occupancy grid.

2. The method according to claim 1, wherein the occupancy grid comprises a two-dimensional representation of grid cells specifying a probability of occupancy corresponding to an associated position in the environment of the object.

3. The method according to claim 2, wherein a first starting transition point is detected in the direction orthogonal to a moving direction of the object.

4. The method according to claim 1, wherein a first starting transition point is detected in the direction orthogonal to a moving direction of the object.

5. The method according to claim 1, wherein a size of the region of interest window is adapted based on a distance of between the object and a center of the region of interest window.

6. The method according to claim 1, wherein a center point of a further region of interest window is determined based on the further transition points in a current region of interest window.

7. The method according to claim 6, wherein the center point and/or an orientation of a further region of interest window is based on a weighted average of the further transition points and the center of the current region of interest window.

8. The method according to claim 6, wherein the center point and/or an orientation of a further region of interest window is based on the further transition points relating to the longest polygon chain in the current region of interest window.

9. The method according to claim 1, wherein an orientation of a further region of interest window is determined based on the further transition points in a current region of interest window.

10. The method according to claim 9, wherein a center point and/or the orientation of a further region of interest window is based on a weighted average of the further transition points and the center of the current region of interest window.

11. The method according to claim 1, wherein a further region of interest window is determined if a current region of interest window does not exceed a boundary of the occupancy grid.

12. An apparatus for detecting a boundary in an environment of an object, comprising:

an occupancy detector adapted to provide an occupancy grid comprising a plurality of grid cells, each grid cell comprising a value for a probability of an occupancy in the environment of the object;

a boundary detector adapted to detect a starting transition point in the occupancy grid based on the values of the grid cells in the occupancy grid, assign a region of interest window in the occupancy grid surrounding the identified starting transition point, and detect further transition points in the occupancy grid based on the values of the grid cells in the region of interest window; and a boundary processor adapted to combine the detected starting transition point and the further detected transition points to a number of polygon chains for specifying a boundary in the occupancy grid.

13. The apparatus according to claim 12, wherein the occupancy detector comprises an optical sensor, a radar sensor and/or an ultrasonic sensor.

14. An advanced driver assistance system comprising the apparatus for detecting a boundary according to claim 12.

15. An autonomous driving vehicle comprising the apparatus for detecting a boundary according to claim 12.

16. An industrial robot system comprising the apparatus for detecting a boundary according to claim 12.

* * * * *